UNITED STATES PATENT OFFICE.

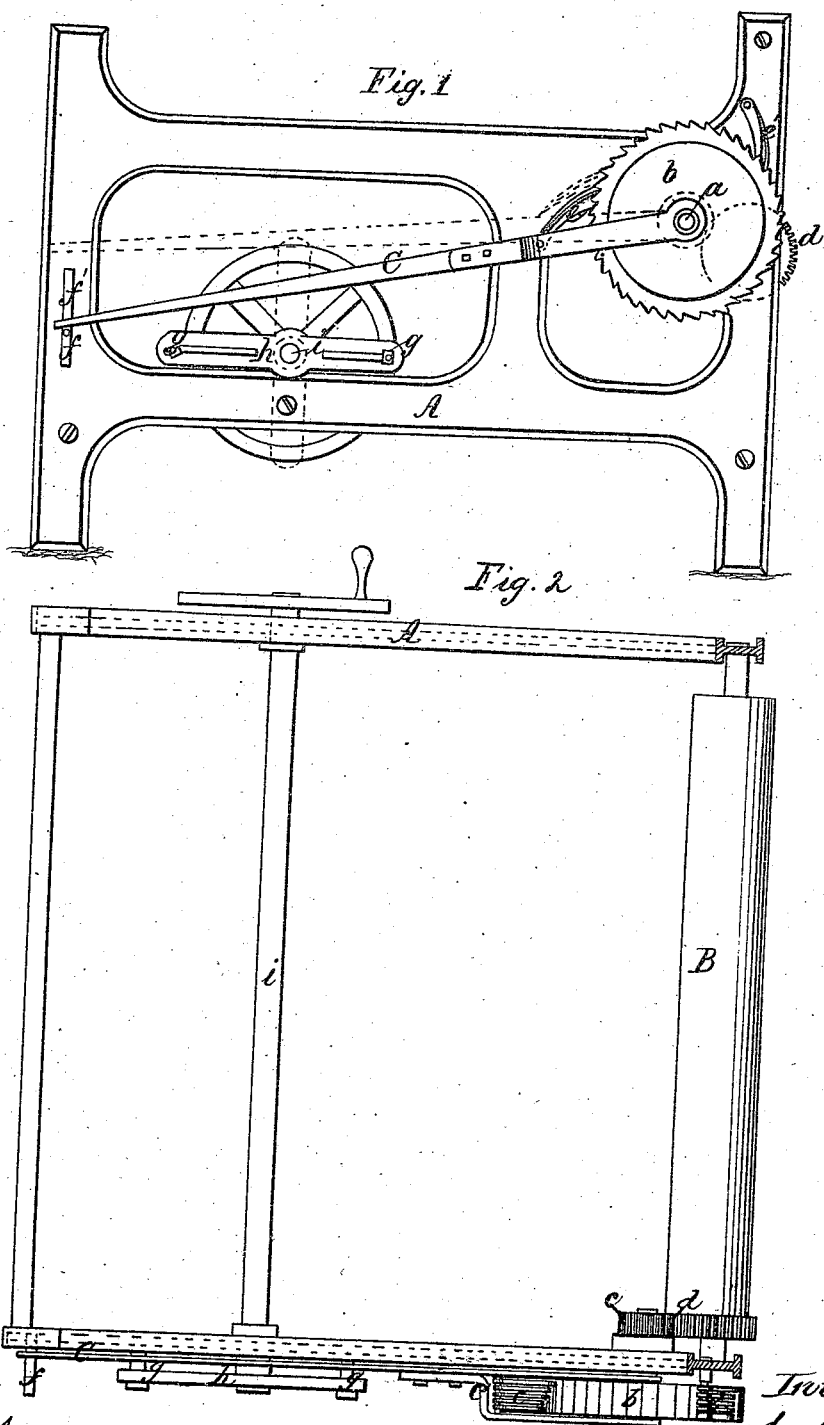

L. L. SHAW, OF LEWISTON, MAINE.

IMPROVEMENT IN TAKE-UP MOTION FOR LOOMS.

Specification forming part of Letters Patent No. 43,868, dated August 16, 1864.

*To all whom it may concern:*

Be it known that I, L. L. SHAW, of Lewiston, in the county of Androscoggin and State of Maine, have invented a new and Improved Take-up Motion for Looms, &c.; and I do hereby declare that the following is a full, clear, and exact description thereof, which will enable others skilled in the art to make and use the same, reference being had to the accompanying drawings, forming part of this specification, in which—

Figure 1 represents a side elevation of this invention. Fig. 2 is a sectional plan or top view of the same.

Similar letters of reference indicate like parts.

The object of this invention is to impart to the cloth-beam of a loom an intermittent rotary motion which is positive in working, and which can be readily adjusted to make close or loose cloth without requiring any change of gears.

The invention consists in an oscillating lever carrying a set (five, more or less) of pawls of different lengths, which gear in the teeth of a ratchet-wheel mounted on an arbor, which connects with the cloth-beam, in combination with an adjustable rest or stop, and with an adjustable revolving slotted arm or disk, with adjustable pins thereon, in such a manner that by shifting the stud or adjusting the pin or pins, or by both the oscillations of the lever, can be increased or diminished at pleasure, and the motion of the cloth-beam is thereby regulated. The arm is double-acting, so that the lever is actuated and motion imparted to the cloth-beam once for each pick or shot, and thereby more even cloth is produced than by the usual plan of taking up two shots at a time.

A represents the frame of a loom, made of iron or any other suitable material in the usual form and manner. This frame forms the bearings for the cloth-beam B, which turns on its axis, and to which motion is imparted by the action of the oscillating lever C. This lever swings freely up and down upon the stud or arbor $a$ of the ratchet-wheel $b$, and a pinion, $c$, on the inner end of the arbor, gears in a cog-wheel, $d$, on the shaft of the cloth-beam, as clearly shown in Fig. 2. It must be remarked, however, that this gearing is not at all essential for the success of my invention, and I reserve the right to change the same as may be deemed convenient or desirable. The lever C carries a set of pawls, $e$, (five, more or less,) which engage with the teeth of the ratchet-wheel $b$. Said pawls are decreasing in length, the longest being nearest to the frame A, and this difference in their length enables them to impart motion to the ratchet-wheel notwithstanding the motion of the lever may not be sufficient to carry one of the pawls over the whole distance of one tooth. The teeth can be made coarse, and yet a very small oscillating motion of the lever is sufficient to impart an intermittent rotary motion to the ratchet-wheel, and through it to the cloth-beam. A series of pawls, $e'$, similar to the pawls $e$, and situated on the opposite side of the ratchet-wheel, prevent the same from turning in the wrong direction. The loose end of the lever C rests upon a stud, $f$, which is secured in a slot, $f'$, of the frame A, being retained in the desired position by a nut, or in any other suitable manner, and an oscillating motion is imparted to said lever by the action of two pins, $g$, which are secured in an arm or disk, $h$, and which takes the place of a cam. This arm is mounted on the end of a driving-shaft, $i$, and it is slotted so that the pins can be adjusted nearer to or farther from the center, and thereby the motion imparted to the lever C can be diminished or increased at pleasure. The throw of this lever can be further regulated by moving the stud $f$ up or down in the slot $f'$. If the stud is moved down, the throw of the lever is increased, and if the stud is moved up it is decreased.

By the combined action of the adjustable pins $g$ and adjustable stud $f$ the throw of the lever C, and the consequent motion of the cloth-beam, can be adjusted with the greatest nicety and in very little time. No gear-wheels have to be changed, and the cloth is taken up after every pick or shot, thus producing a fabric of a uniform and even texture.

I claim as new and desire to secure by Letters Patent—

The adjustable rest $f$ and adjustable pins $g\,g$ on the revolving arm or disk $h$, in combination with the lever C, pawls $e$, ratchet-wheel $b$, and cloth-beam B, constructed and operating in the manner and for the purpose substantially as herein shown and described.

L. L. SHAW.

Witnesses:
D. M. AYER,
W. A. BAUM.